United States Patent Office 3,558,561
Patented Jan. 26, 1971

3,558,561
TERPOLYMERS OF PERHALOACETONES, LOWER ALKYLENE OXIDES AND PROPYLENE SULFIDE
Harry A. Smith, Midland, Mich., assignor to The Dow Chemical Company, Midland, Mich., a corporation of Delaware
No Drawing. Filed June 18, 1968, Ser. No. 737,819
Int. Cl. C08g *15/00*
U.S. Cl. 260—63                     4 Claims

ABSTRACT OF THE DISCLOSURE

This invention relates to a terpolymer composition comprising interpolymers of perhaloacetone, a lower alkylene oxide and propylene sulfide.

---

This invention relates to new terpolymer compositions and more specifically relates to terpolymers of a perhaloacetone, lower alkylene oxide and propylene sulfide.

While polymers of perhaloacetones with alkylene oxides are known in the art and described in U.S. 3,316,216 such copolymers are difficult to apply as coatings due to their relatively low solubility in all but a few solvents such as ketones and ethers and even these solvents have the disadvantage of being highly flammable. In addition, while these polymers have properties which indicates they would have utility as oil additives, they have poor compatability with hydrocarbons and therefore their utility for this purpose is severely impaired. These disadvantageous characteristics have been found to be improved upon or eliminated by combining with the components of such copolymer propylene sulfide to produce a terpolymer. Such terpolymers of perfluoroacetone, alkylene oxide and propylene sulfide have the advantages not only of improved solubility in organic solvents but also when used as coatings possess enhanced water repellency.

It is an object of this invention to provide to the art novel terpolymer compositions. A further object of this invention is to provide to the art terpolymers of a perhaloacetone, a lower alkylene oxide and propylene sulfide thereby providing a wide range of solid and liquid polymers suitable for water repellants, lubricants and oil additives. These and other objects and advantages of the present invention will become apparent upon the reading of the following detailed specification.

The novel polymer compositions of this invention comprise terpolymers of a perhaloacetone, a lower alkylene oxide and propylene sulfide in mole ratios of from about 100:99:1 to about 40:1:99 of perhaloacetone to lower alkylene oxide to propylene sulfide. Such compositions provide a range of polymers which include liquids and solids having softening points up to about 190° C. and molecular weights ranging from about 5,000 to greater than 20,000. The softening point of the terpolymer is controlled by controlling the mole ratio of ethylene oxide to propylene sulfide contained in the terpolymer. At ratios of ethylene oxide to propylene sulfide of less than about 4:1 the terpolymers produced are usually liquids. As the ratio of ethylene oxide to propylene sulfide increases from about 4:1, the products obtained are solids having ever-increasing softening points. At the upper end of the range of ethylene oxide concentration, the products are crystalline solids. At lower proportions of ethylene oxide, the products become amorphous solids and finally liquids at the lower end of the range. A preferred embodiment of the present invention resides in a terpolymer composition of hexafluoroacetone, ethylene oxide and propylene sulfide in a mole ratio of between about 95:95:5 and about 70:70:30.

As used herein the term "perhaloacetone" refers to the perchloro- and perfluoroacetones as well as to perhaloacetones containing both chloro- and fluoro-substituents, e. g. hexachloroacetone, hexafluoroacetone, dichlorotetrafluoroacetone, tetrachlorodifluoroacetone, monochloropentafluoroacetone and the like.

The term "lower alkylene oxides," as used herein, refers to alkylene oxides having from 2 to 4 carbon atoms e.g. ethylene oxide, propylene oxide, butylene oxide (1,2-epoxybutane) and cis and trans 2,3-epoxybutane.

The novel polymers of this invention are prepared by contacting the desired proportions of perhaloacetone, lower alkylene oxide and propylene sulfide as liquids at a temperature of between about $-78°$ C. and about $-200°$ C. sealing the reactants in a reaction vessel, increasing the temperature to about 25° C. and allowing the reaction to take place under autogenous pressure. In general, a react-time of about 48 to about 120 hours is necessary to achieve an adequate degree of polymerization. When the polymerization reaction is complete, the reaction vessel is opened, the volatiles are removed and the polymer is recovered. It is desirable that the reaction be conducted under substantially anhydrous conditions as the presence of even minor amounts of water has a detrimental effect on both the rate of polymerization and on the molecular weight of the final terpolymer product.

The liquid and solid polymer compositions of this invention are soluble in hydrocarbons and chlorinated solvents and find particular utility as coatings and as additives to hydrocarbon lubricants.

The following examples are provided to more fully illustrate the invention but are not construed to be limiting to the scope thereof.

EXAMPLE 1

Into oven dried glass ampules were placed mixtures containing 0.015 gram ($10^{-4}$ mole) of cesium fluoride, 0.32 to 1.91 grams (0.0043 to 0.0257 mole) of propylene sulfide (PS), 3 grams (0.0181 mole) of hexafluoroacetone (HFA) and 1.70 to 0.76 grams (0.387 to 0.0173 mole) of ethylene oxide (EO). The various compositions were mixed at $-196°$ C., sealed in a glass ampule and brought to room temperature. After reaction at room temperature for 72 hours, the ampule was cooled to $-196°$ C., opened and the volatiles removed, leaving the polymer as a residue. The polymer composition was then determined by elemental analysis and molecular weight of the polymer was determined by osmometry. The results of these experiments are shown in the following Table I.

| Sample No. | Charge mole ratio HFA/EO/PS | Softening point, °C. | Average number, mol. wt. | Polymer comp. mole ratio HFA EO/PS | Polymer description |
|---|---|---|---|---|---|
| 1 | 4.2/9.5/0.5 | 115–150 | 8,500 | 5.7/5.7/1 | Crystalline hard. |
| 2 | 4.2/9.0/1.0 | 127–134 | 12,600 | 3/3/1 | White solid. |
| 3 | 4.2/8.0/2.0 | 25–58 | 9,700 | 2/2/1 | Soft amorphous solid. |
| 4 | 4.2/7.0/3.0 | (¹) | 13,400 | 1.25/1/1 | Amorphous white wax |
| 5 | 4.2/6.5/3.5 | (¹) | 8,600 | 2/0.8/3 | |
| 6 | 4.2/6.0/4.0 | (¹) | 10,600 | 1/0.2/2 | |

¹ Liquid.

Various modifications can be made in the present invention without departing from the spirit or scope thereof for it is understood that we limit ourselves only as defined in the appended claims.

I claim:
1. A terpolymer composition which consists of the interpolymer of a perhaloacetone, a lower alkylene oxide of 2 to 4 carbon atoms and propylene sulfide in a mole ratio of from about 100:99:1 to about 40:1:99.
2. The terpolymer composition of claim 1 wherein the perhaloacetone is hexafluoroacetone.
3. The terpolymer composition of claim 1 wherein the lower alkylene oxide is ethylene oxide.
4. The terpolymer composition of claim 1 wherein the perhaloacetone is hexafluoroacetone, the lower alkylene oxide is ethylene oxide and the mole ratio of monomers in the terpolymer is from about 95:95:5 to about 70:70:30 of hexafluoroacetone to ethylene oxide to propylene sulfide.

References Cited
UNITED STATES PATENTS

| | | | |
|---|---|---|---|
| 3,316,216 | 4/1967 | Fawcett et al. | 260—63 |
| 3,468,847 | 9/1969 | Doorenbos et al. | 260—63 |
| 3,502,619 | 3/1970 | Smith | 260—63 |

WILLIAM H. SHORT, Primary Examiner

L. L. LEE, Assistant Examiner

U.S. Cl. X.R.

260—2, 33.6, 33.8